United States Patent [19]

Ishida et al.

[11] 4,349,260
[45] Sep. 14, 1982

[54] AUTOMATIC ELECTRONIC FLASH DEVICE PRODUCING PRELIMINARY FLASH LIGHT AND PRIMARY FLASH LIGHT

[75] Inventors: Tokuji Ishida, Daito; Masayoshi Sahara, Sennan, both of Japan

[73] Assignee: Minolta Camera Kabushiki Kaisha, Osaka, Japan

[21] Appl. No.: 220,290

[22] Filed: Dec. 29, 1980

[30] Foreign Application Priority Data

Dec. 31, 1979 [JP] Japan .................................. 54-171489

[51] Int. Cl.³ ....................... G03B 15/05; H05B 41/26
[52] U.S. Cl. .................................. 354/145; 315/241 P
[58] Field of Search ........................... 354/27, 32–35, 354/60 F, 127, 128, 139, 145, 149; 315/241 P, 151, 157, 159

[56] References Cited

U.S. PATENT DOCUMENTS 3,547,017 12/1970 Harvey ................................. 354/33
4,189,219 2/1980 Hasegawa et al. ............. 354/145 X

*Primary Examiner*—L. T. Hix
*Assistant Examiner*—William B. Perkey
*Attorney, Agent, or Firm*—Watson, Cole, Grindle & Watson

[57] ABSTRACT

An automatic electronic flash device capable of producing both a preliminary flash light used for automatic determination of a diaphragm aperture of a camera and a primary flash light used for actual photographing has signal contacts which are less in number than the signals to be transmitted from the camera to the flash device for the control of the production of the preliminary and primary flash lights. Thus, a common signal contact is used for transmission of both a preliminary flash control signal and a primary flash stop signal. The flash device is provided with a control circuit which properly delivers the two signals to a preliminary flash control circuit section and a primary flash termination circuit section of the flash device in dependence upon whether or not a synchronizing signal for initiating the production of the primary flash light appears at the synchronizing contacts. The preliminary flash control signal controls both initiation and termination of the production of the preliminary flash light in an embodiment and only termination of the production of the preliminary flash light in another embodiment, with which another signal contact is used for receiving a preliminary flash command signal for initiating the production of the preliminary flash light from the camera.

12 Claims, 6 Drawing Figures

AUTOMATIC ELECTRONIC FLASH DEVICE PRODUCING PRELIMINARY FLASH LIGHT AND PRIMARY FLASH LIGHT

BACKGROUND OF THE INVENTION

1. Field of the Invention

The present invention relates to an automatic electronic flash device (hereinafter called merely "strobo") for use in a flash photography system which automatically determines a diaphragm aperture by the aid of a preliminary flash light produced prior to production of a primary flash light with the intensity of preliminary flash light maintained substantially constant, and more particularly it pertains to a control device of the strobo for controlling a preliminary flash and a primary flash in accordance with signals from a camera.

2. Description of Prior Arts

In known automatic diaphragm control cameras which perform T.T.L (through the lens) light measurement through the diaphragm aperture being stopped down and which includes means to arrest the diaphragm when the value of the light measurement represents a given relationship with respect to a reference level, the diaphragm aperture is determined to its fully open aperture for such a low scene brightness condition that requires a flash illumination although it is desirable to set the diaphragm aperture to a specific size such as F5.6 for flash photography.

A flash photography system which eliminates this drawback has been proposed in Co-pending patent application Ser. No. 207,026 filed on Nov. 14, 1980, titled "CAMERA DIAPHRAGM CONTROL DEVICE FOR FLASH PHOTOGRAPHY" and assigned to the same assignee. The proposed system employs a strobo which produces a preliminary flash light prior to production of a primary flash light with the intensity of the preliminary flash light maintained substantially constant at least for the period required for the diaphragm to be stopped down to a specific aperture. As the scene to be photographed is illuminated by the preliminary flash light, the diaphragm is allowed to be stopped down and a diaphragm arresting means arrests the diaphragm thus being stopped down when the value of the T.T.L light measurement represents a given relationship with respect to a reference signal which has been stored prior to initiation of the diaphragm stop down operation in accordance with information of the desired specific aperture and the value of the T.T.L light measurement through the fully open diaphragm aperture. For these operations of the proposed system, signals are to be transmitted from a camera to a strobo at least for the control of the preliminary flash and the control of the primary flash and thus the number of the signal transmission contacts or terminals is increased on the strobo as well as on the camera. However, an increase of the number of signal transmission contacts or terminals generally leads to an increase in occurrence of troubles due to fault in conduction or misconduction between the corresponding contacts caused by corrosion of those contacts and the like.

SUMMARY OF THE INVENTION

It is, accordingly, a primary object of the present invention to provide an improved strobo dedicated for the aboved described flash photography system and having a control device which enables the number of signal transmission contacts to be reduced or minimized.

Another object of the present invention is to provide a strobo of the above described type which is capable of transmitting to a camera a signal indicating that the strobo is ready for flash photography.

Still another object of the present invention is to provide a strobo of the above described type which is capable of transmitting to a camera a signal indicating that automatic control of the primary flash light has been completed.

Yet another object of the present invention is to provide a strobo of the above described type which is capable of transmitting to a camera a signal indicating that the strobo is of the dedicated type.

A strobo of the present invention is adapted to receive a preliminary flash control signal and a primary flash stop signal through a common contact from a camera. To properly deliver the two signals thus received to a preliminary flash control section and to a primary flash terminating section of the strobo circuit, the strobo circuit includes a control circuit which discriminates the two signals from one another in dependence upon whether or not a primary flash initiating signal has been produced, i.e., whether or not a synchronizing switch in the camera has been closed. For the receipt of this primary flash initiating signal, the strobo is provided with a pair of contacts in addition to the above common contact, one of the contacts being for common grounding and the other being connectable to the synchronizing switch through a corresponding contact provided on the camera. It is to be noted that the contact for grounding may not be positively provided but may be a metal portion of the housings of the camera and strobo.

In a preferred embodiment of the present invention, the strobo is provided with a ready signal generator which generates a ready signal in the form of multi-level wave signal as disclosed in U.S. Pat. No. 4,091,396 when a main capacitor of the strobo has been charged up to a given level. The ready signal generator is also commonly used for generating a flash control termination signal in the form of a multi-level wave signal when automatic control of the primary flash light has been completed. Preferably, the frequency of the flash control termination signal is set to be distinguishably different from that of the ready signal. The ready signal and the flash control termination signal are transmitted to the camera through another common contact provided on the strobo and a corresponding contact provided on the camera, so that the camera can indicate that the strobo is ready for photography and that the flash photography thus having been done will result in a proper exposure. Furthermore, the strobo is provided with a voltage regulator or a constant voltage source which produces a constant voltage signal indicating that the strobo is a dedicated one for the above described flash photography system making use of a preliminary flash light for determination of the diaphragm aperture. The voltage signal is transmitted to the camera through the common contact provided for the transmission of the preliminary flash control signal and the primary flash stop signal.

The above and other objects and features of the present invention will become more apparent from the following description of preferred embodiments of the present invention taken in conjunction with the accompanying drawings.

BRIEF DESCRIPTION OF THE DRAWINGS

FIGS. 1 and 2 are circuit diagrams of a flash photography system according to a first embodiment of the present invention, in which FIG. 1 shows a circuit arrangement of a camera while FIG. 2 shows a circuit arrangement of a strobo;

FIGS. 4 and 5 are circuit diagrams of a flash photography system according to a second embodiment of the present invention, in which FIG. 4 shows a circuit arrangement in a camera while FIG. 5 shows a circuit arrangement in a strobo.

DETAILED DESCRIPTION OF PREFERRED EMBODIMENTS

Figure 1:
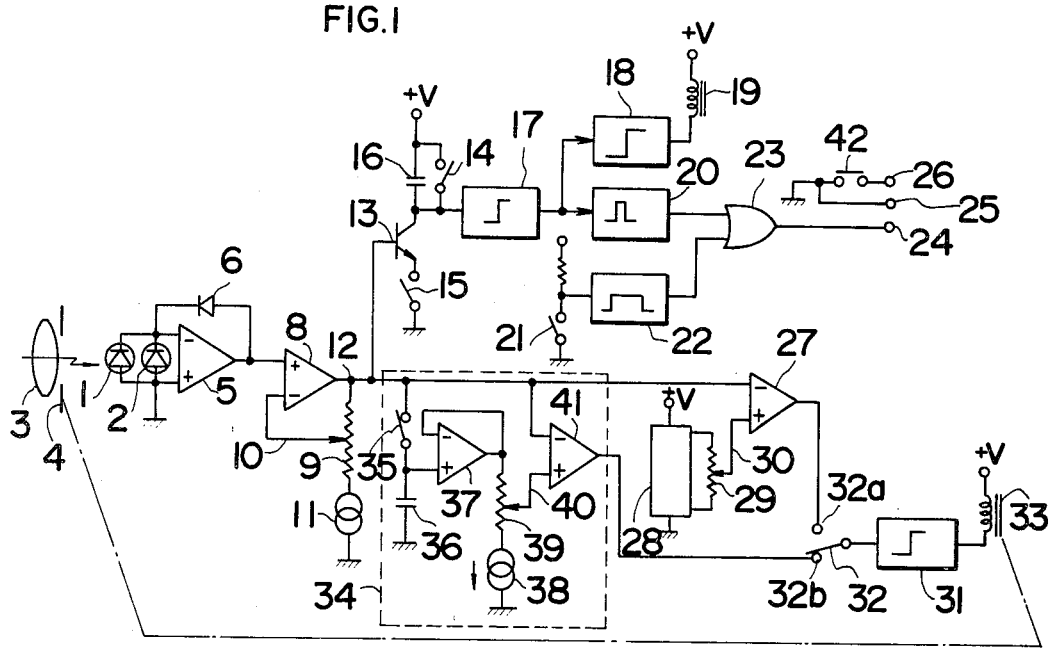
Figure 3:
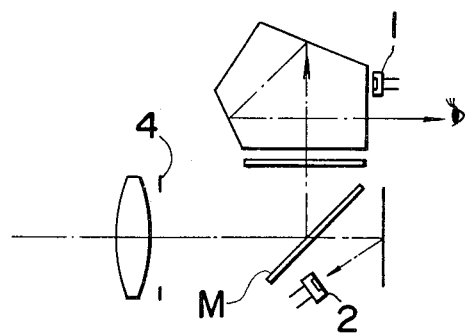
FIG. 3 schematically illustrates the disposition of light measuring photodiodes.
Figure 2:
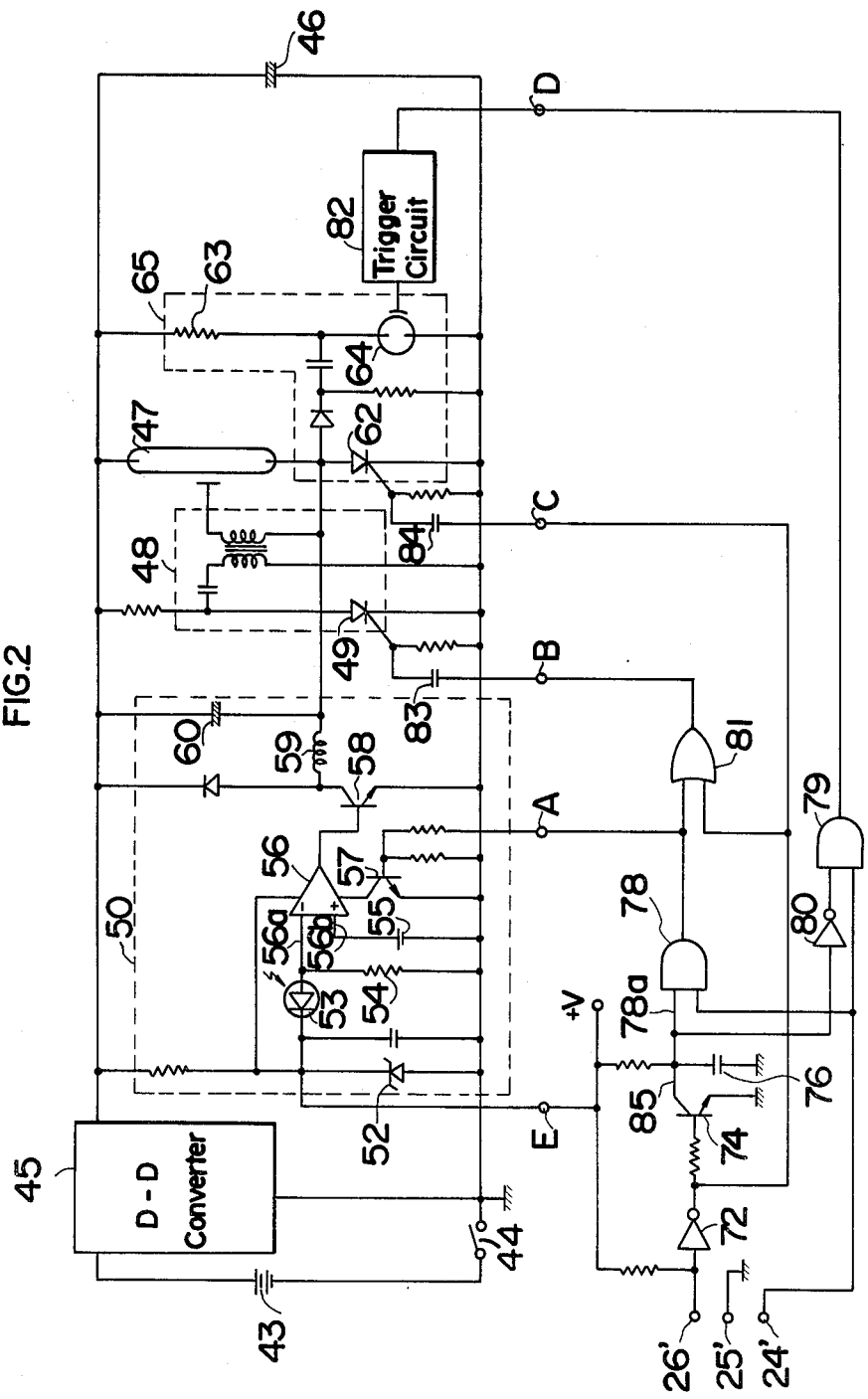

Referring to FIG. 1 showing a circuit arrangement in the camera with which a strobo of the first embodiment having the circuit arrangement shown in FIG. 2 is used, light receiving elements 1 and 2 such as photodiodes receive a scene light which has passed through an objective lens 3 and the aperture of a diaphragm 4. As shown in FIG. 3, light receiving element 1 is disposed at a position where it can receive the scene light before initiation of exposure operation while light receiving element 2 is disposed at a position where it can receive the scene light reflected from a surface of a leading shutter curtain and/or a surface of a film during exposure operation. An operational amplifier 5 and a diode 6 together constitute a logarithmic conversion circuit which produces output voltages being proportional to the logarithm of the light intensity incident on light receiving elements 1 and 2. An operational amplifier 8 receives the output voltages from the logarithmic conversion circuit at its positive input terminal. A potentiometer 9 is connected in series with a constant current source 11 and its sliding terminal connected to a negative input terminal of operational amplifier 8 is set at a position dependent on a set film sensitivity. Thus, at a junction 12 there appears a voltage signal which is commensurate with a proper shutter speed determined by the measured scene brightness, the diaphragm aperture at a time of the light measurement and the set film sensitivity.

Explanation will be given of the circuits for shutter speed control and diaphragm determination through explanation of the operation of the circuit arrangement shown in FIG. 1 in the case of a normal or day-light photography. A switch 32 shown at the lower right portion of the Figure is changed over from a contact 32b to a contact 32a upon selection of a normal or daylight photography. In this case, the camera functions in a shutter speed priority automatic diaphragm control mode. A potentiometer 29 connected to a constant voltage source 28 has a slider terminal 30 which is slid to a position dependent on a set shutter speed. Thus, at slider terminal 30 there appears a voltage which is commensurate with the set shutter speed. A comparator 27 receives this voltage as a reference voltage and compares the voltage signal at junction 12 with this reference voltage.

A switch 21 shown at the center of the Figure is closed in response to a shutter release operation. The closing of switch 21 brings an electromagnetic release mechanism (not shown) into operation, so that it allows diaphragm 4 to start stop-down operation. At the same time, the closing of switch 21 triggers a one-shot circuit 22, which in turn produces a high voltage signal with the duration time sufficiently longer than the period of time required for diaphragm 4 to be stopped down to a minimum aperture.

The voltage signal at junction 12 varies as diaphragm 4 is stopped down. When this voltage signal goes below the reference voltage which is commensurate with the set shutter speed, the output voltage of comparator 27 is inverted from a high level to a low level. In response to the inversion of the output of comparator 27, a switching circuit 31 is actuated to interrupt the current flowing through an electromagnet 33, which in turn arrests diaphragm 4 being stopped down so that the diaphragm aperture is automatically determined. Thereafter, a movable mirror M of the camera is lifted up from a image viewing position shown in FIG. 3 to a picture taking position by means of an electromagnetic means (not shown) responsive to the voltage drop at the trailing edge of the high voltage signal from one-shot circuit 22 and a leading shutter curtain of the shutter starts travelling in response to completion of the lift-up of movable mirror M.

Switches 14 and 15 are opened and closed respectively upon the start of the leading shutter curtain travel. At this time, the voltage signal at junction 12 is commensurate with a shutter speed which is proper for the automatically determined diaphragm aperture. This shutter speed will coincide with the set shutter speed if there occurs no change in the scene brightness before and after the diaphragm determination. The voltage at junction 12 is applied to the base of a logarithmic expansion transistor 13 and a current which is proportional to the logarithmic expansion, i.e., the exponent of the voltage at junction 12 flows through the collector-emitter path of transistor 13 to charge a capacitor 16. When a voltage at the negative terminal of capacitor 16 goes below a given level, the output of a switching circuit 17 is inverted from a low level to a high level and a current supply to an electromagnet 19 is interrupted. This causes a trailing shutter curtain to be released from arrestment by electromagnet 19 and thus the trailing shutter curtain starts travelling to terminate an exposure. A one-shot circuit 20 is triggered by the inversion of the output of switching circuit 17 to generate a pulse having a width of approximately 1 m sec., the pulse serving as a primary flash stop signal upon a flash photography as hereinafter described.

Next, explanation is given of the operation of the circuit arrangement shown in FIG. 1 in the case of a flash photography. In this case, switch 32 is changed-over to contact 32b. This causes comparator 27 to be disconnected from the circuit 31 as well as causes the circuit indicated by dotted block 34 to be effective for the diaphragm control. When switch 21 is closed, one-shot circuit 22 is triggered as described above, generating a high voltage signal of the duration time which is sufficiently longer than the period of time required for diaphragm 4 to complete its stop-down operation. This high voltage signal is fed to a strobo through a contact 24 after passing through an OR gate 23, whereby the strobo produces a preliminary flash light for the period of time during which this high voltage signal continues to exist. Thus, this high voltage signal controls both initiation and termination of a preliminary flash of the strobo.

In the circuit indicated by dotted block 34, a switch 35 is opened simultaneously with initiation of a stop-down operation of diaphragm 4. Accordingly, a capacitor 36 memorizes the voltage signal at junction 12, which voltage signal is commensenate with the brightness of the scene being illuminated by the preliminary flash light with the brightness measured through the diaphragm aperture immediately before initiation of the stop-down operation of diaphragm 4. This voltage signal thus memorized or stored in capacitor 36 is applied to the upper end of a potentiometer 39 through a buffer amplifier 37. Potentiometer 39 is connected in series with a constant current source 38 so that a constant current flows therethrough and has a slider terminal 40 which is automatically set to a position dependent on the value of the fully open diaphragm aperture, i.e., the value of the minimum f-number of an objective lens mounted on the camera, by means of an information transmitting member (not shown) of the objective lens. For example, when an objective lens whose fully open diaphragm aperture is F1.4 is used, slider terminal 40 is automatically set to a position where a voltage which is lower than the voltage at the upper end of potentiometer 39 by four steps in terms of exposure value Ev appears at sliding terminal 40. In contrast, with an objective lens whose fully open diaphragm aperture is F2, slider terminal 40 is automatically set to a position where a voltage which is lower than the voltage at the upper end of potentiometer 39 by three steps in the terms of exposure value Ev appears at slider terminal 40. Thus, at slider terminal 40, there always appears a voltage commensurate with a shutter speed which is proper for the brightness of the scene being illuminated by the preliminary flash light, a set film sensitivity and a specific diaphragm aperture. In the above example, the specific aperture is F5.6 which is four steps smaller than F1.4 and three steps smaller than F2. The voltage at slider terminal 40 is applied to a comparator 41 as a reference voltage.

As the stop-down operation of diaphragm 4 advances, the voltage at junction 12 goes down. Comparator 41 compares the voltage at junction 12 with the reference voltage at sliding terminal 40 during the stop-down operation of diaphragm 4. When the voltage at junction 12 goes below the reference voltage, the output of comparator 41 is inverted from a low level to a high level. This causes switching circuit 31 to interrupt the current flowing through electromagnet 33, so that the stop-down operation of diaphragm 4 is stopped. Hence, in the above example, diaphragm 4 is automatically set to F5.6.

When the high voltage signal from one-shot circuit 22 terminates, the strobo stops the production of the preliminary flash light and movable mirror M begins to be lifted up. Thereafter, the leading shutter curtain starts travelling. When synchronizing switch 42 is closed upon completion of the leading shutter curtain travel, a ground level synchronizing signal is transmitted to the strobo through synchronizing contacts 25 and 26, causing the strobo to start producing a primary flash light. During the production of the primary flash light, capacitor 16 is charged and the outputs of switching circuits 17 and 18 are inverted from a low level to a high level respectively when the voltage at the negative terminal of capacitor 16 goes below the given level. This causes the trailing shutter curtain to start travelling and one-shot circuit 20 to generate a pulse of the width of 1 m sec. as described above. This pulse is transmitted to the strobo through contact 24 after passing through OR gate 23, causing the strobo to stop the production of the primary flash light.

As is clear from the above explanation, the camera is provided with three contacts 24, 25 and 26, of which contacts 25 and 26 are used for transmitting the synchronizing signal and contact 24 is used for transmitting a preliminary flash control signal for controlling initiation and termination of a preliminary flash of the strobo and a primary flash stop signal for terminating a primary flash of the strobo. Thus, contact 24 is commonly used for transmission of the two signals.

Referring to FIG. 2 which shows the circuit arrangement in the strobo according to the first embodiment of the present invention, designated at 43 is a power source battery of the strobo and at 44 is a power switch. When switch 44 is closed a D-D converter 45 is brought into operation and generates a D.C. voltage of 300 V, with which a main capacitor 46 is charged, storing electricity as energy for causing a flash tube 47 to produce both preliminary and primary flash lights. A block 50 encircled by a dotted line represents a preliminary flash enabling circuit, a block 48 encircled by a dotted line represents a circuit for triggering flash tube 47 and a block 65 represents a primary flash stop circuit. Operations of these circuits are controlled by a control circuit shown at the lower part of the Figure.

Contacts 24', 25' and 26' are brought into contact with contacts 24, 25 and 26 respectively when the strobo is mounted on the camera. With synchronizing switch 42 being open, a Zener voltage of a Zener diode 52 is applied to a contact 26' when power switch 44 is closed. This voltage is transmitted to the base of transistor 74 with its level inverted by an inverter 72 and keeps transistor 74 in an OFF state so that a capacitor 76 is charged up to the Zener voltage. Therefore, an AND gate 78 having an input terminal 78a to which the voltage at a junction 85 is directly applied is unblocked while an AND gate 79 having an input terminal to which a voltage at junction 85 is applied with its level inverted by an inverter 80 is blocked. When switch 21 in FIG. 1 is closed in response to a shutter release operation causing one-shot circuit 22 to produce a high voltage signal for the given duration of time the high voltage signal is applied to contact 24' through contact 24. This high voltage signal causes AND gate 78 to generate a high voltage signal, which is then transmitted to a junction A connected to the base of transistor 57 in the block 50, rendering transistor 57 conductive. Therefore, a comparator 56 is supplied with an electric power through transistor 57 and generates a high voltage signal which renders a transistor 58 conductive. On the other hand, the high voltage signal generated by AND gate 78 is also applied to a junction B connected to the gate of a thyrister 49 through a capacitor 83 after passing through an OR gate 81. This causes a voltage applied to the gate of thyrister 49 to rise up for a moment and therefore thyrister 49 turns on so that a trigger circuit 48 operates to discharge main capacitor 46 through flash tube 47, causing flash tube 47 to start producing or emitting a light. With synchronizing switch 42 in the camera being open, a thyrister 62 remains in the OFF state because a low voltage is applied to a junction C connected to the gate of thyrister 62 through a capacitor 84. In this case, therefore, a discharge current of main capacitor 46 which energizes flash tube 47 flows through transistor 58 after passing through a coil 59. A part of the light produced by flash tube 47 impinges on a light receiving element 53 located in the strobo. As the discharge current which energizes flash tube 47 increases and the intensity of the light produced by flash tube 47 rises up, the output current of light receiving element 53 increases, causing a voltage at an input terminal 56a of a comparator 56 to rise up. When the voltage at input terminal 56a exceeds a reference voltage at another input terminal 56b given by a reference voltage source 55, the output voltage of comparator 56 is inverted from a high level to a low level so that transistor 58 turns off. However, the discharge current passing through flash tube 47 does not rapidly drop down to zero but rather continues to flow with its amount gradually decreased, due to the self-induction of coil 59 and the discharge current of capacitor 60. As a result, in response to the decrease in the intensity of the light produced by flash tube 47, the voltage at the terminal 56a decreases until it goes below another reference level at terminal 56b so that the output voltage of comparator 56 is inverted from a low level to a high level and thus transistor 58 is rendered conductive so that the current passing through flash tube 47 begins to increase again. It is to be noted that the voltage of voltage source 55 is switchable between two levels in accordance with the output of comparator 56 to provide the latter with a hysterisis characteristics. Thus, if the voltage difference for the hysterisis of comparator 56, the inductance of coil 59 and the capacitance of capacitor 60 are properly selected, flash tube 47 is subjected to relaxation oscillation with a period of several tens to several hundreds micro seconds and continues to produce a light whose intensity is relatively low and substantially constant for practical use. The light thus produced is a preliminary flash light. During the continuous production of this light, automatic determination of the aperture of diaphragm 4 is completed as described above.

When switch 42 in FIG. 1 is closed in response to the completion of the leading shutter curtain travel, contact 26' is grounded through contacts 26, 25 and 25', causing a high voltage signal to be applied to the base of a transistor 74 through an inverter 72, so that transistor 74 is rendered conductive. This allows a capacitor 76 to discharge and thus after a slight lapse of time, AND gate 79 is enabled to generate a high voltage signal while AND gate 78 is disabled to prevent generation of a high voltage signal. On the other hand, since the high voltage signal from inverter 72 is applied to the junction C connected to the gate of thyristor 62 through capacitor 84, thyristor 62 is rendered conductive, causing flash tube 47 to start producing a primary flash light. In this case, the high voltage signal from inverter 72 is applied to junction B through OR gate 81, rendering thyristor 49 conductive for the re-triggering of flash tube 47.

With switch 42 closed, AND gate 79 is enabled to generate a high voltage signal while AND gate 78 is disabled respectively as described above. The light from the scene being illuminated by the primary flash light is received by light receiving element 2 and capacitor 16 is charged with a current which is commensurate with the intensity of the received light. When the voltage at the negative terminal of capacitor 16 goes below the given level, the trailing shutter curtain starts travelling and one-shot circuit 20 produces a pulse for approximately 1 m sec. as described above. This pulse is transmitted to AND gate 79 through contacts 24 and 24' and then causes AND gate 79 to generate a high voltage signal during the duration of the pulse, whereby the high voltage signal is transmitted to junction D connected to trigger circuit 82. Trigger circuit 82 includes a thyrister (not shown) and has a construction similar to trigger circuit 48. Upon receipt of the high voltage signal through junction D, trigger circuit 82 causes a discharge tube 64 to discharge the remaining electricity stored in main capacitor 46. Then, a voltage at the lower end of a resistor 63 rapidly drops down and this voltage drop is transmitted to the anode of thyrister 62 through a capacitor and a diode (both being not numbered). Accordingly, thyrister 62 turns off, causing flash tube 47 to stop the production of the primary flash light.

With the strobo of the first embodiment, the number of contacts is less than the number of the signals transmitted from the camera to the strobo because the circuit arrangement shown in FIG. 2 includes means for discriminating two signals (i.e., the preliminary flash control signal and the primary flash stop signal) received through common contact 24', from one another depending on whether before or after the closing of synchronizing switch 42 in the camera. Therefore, there will be less anxiety of mis-conduction or contact fault between the contacts on the strobo and the corresponding contacts on the camera and occurrence of troubles due to such a cause will be minimized.

Figure 4:
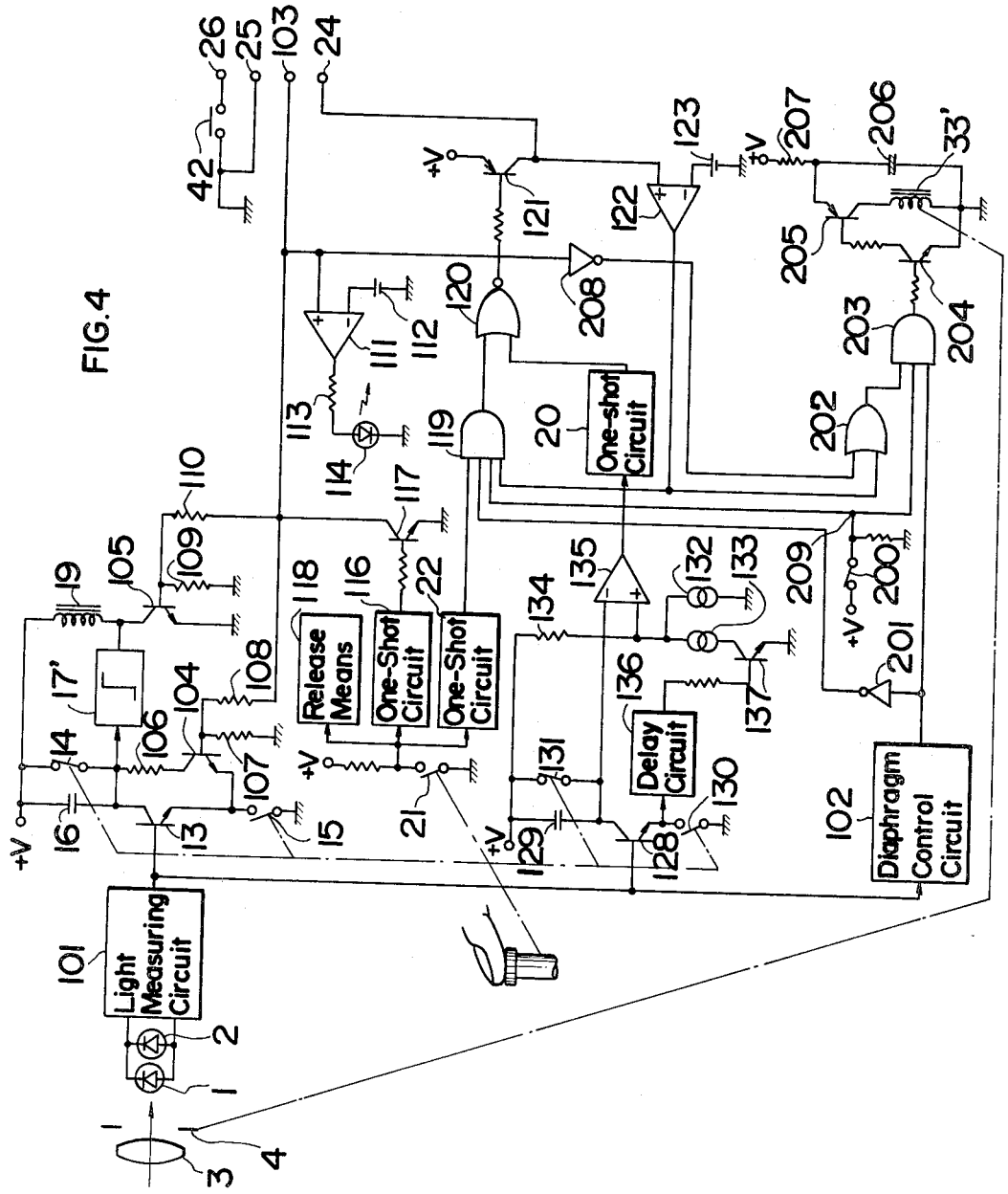
Figure 5:
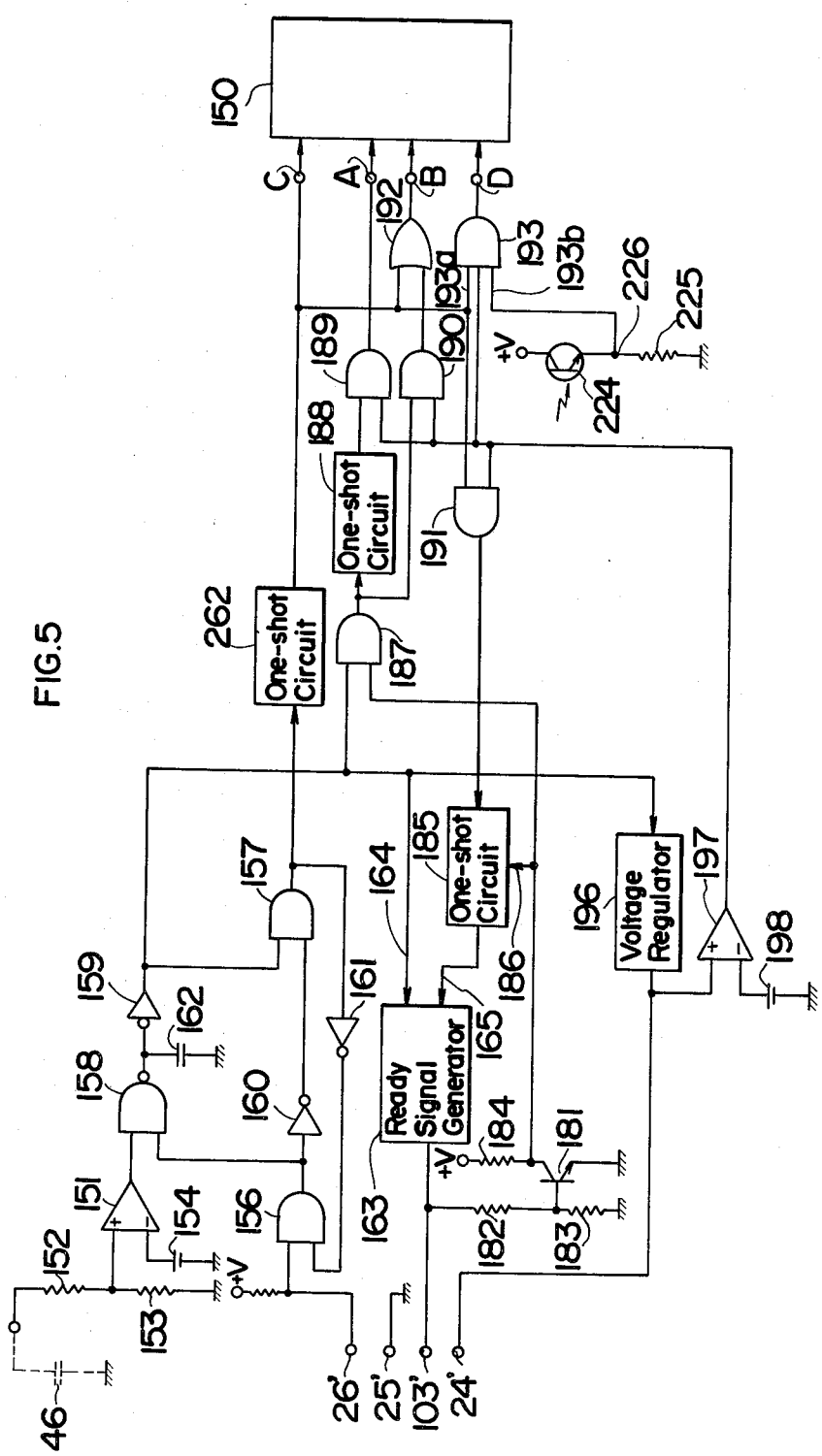

FIG. 5 shows a circuit arrangement of a strobo according to the second embodiment of the present invention, which is used in combination with a camera having a circuit arrangement shown in FIG. 4. The two circuits shown in FIGS. 4 and 5 are electrically connected to one another by a coupling means (not shown) such as a so-called hot shoe when the strobo is mounted on the camera. At first, various operation features achieved by the combination will be hereinafter summarized.

The strobo includes a voltage detector for detecting a voltage level across a main capacitor to generate a high voltage signal when the main capacitor has been charged up to a given level and a ready signal generator responsive to the high voltage signal from the voltage detector for generating a ready signal in the form of multi-level wave signal which oscillates between 1.5 V and 2.5 V with a period of 0.5 sec.

In response to the ready signal, a light emitting diode (LED) located inside a camera viewfinder flickers with a period of 0.5 sec., notifying to a camera operator that the strobo is ready for flash photography. At the same time, a camera exposure time control device, in response to the ready signal, changes its modes of operation such that an exposure time which is suited for flash photography is obtained.

When release switch 21 of the camera is closed by a manual operation, a camera release means 118 initiates its operation for initiating stop-down of diaphragm 4. At the same time, a voltage level of a terminal 103, adapted to receive the ready signal, drops down to a low level for one msec. and a preliminary flash control signal in the form of pulsive high voltage signal is generated for forty-five msec. from terminal 24.

The strobo starts producing a preliminary flash light when it receives the low voltage signal from terminal 103 as a preliminary flash command signal under the existance of the preliminary flash control signal. The mode of the diaphragm controls operation making use of a preliminary flash of the strobo is similar to that of the first embodiment. Thus, when the diaphragm aperture is determined by inversion of the state of an electromagnet during production of a preliminary flash light by the strobo, the preliminary flash control signal from terminal 24 is stopped, and therefore the strobo stops producing the preliminary flash light.

Subsequent to the diaphragm aperture determination, a shutter of the camera is opened to initiate an exposure. In conjunction with the exposure initiation, a capacitor 129 is charged by a current which is commensurate with the intensity of the scene light having passed through an objective lens and the diaphragm aperture thus determined. In response to a full opening of the shutter, a synchronization switch 42 is closed, triggering the strobo such that the strobo starts producing a primary flash light. The ready signal generator also stops generating the ready signal in response to the triggering of the strobo, causing the shutter to start closing.

During production of a primary flash light by the strobo, a high voltage signal is again generated at terminal 24 when capacitor 129 has been charged up to a given voltage. This high voltage signal stops the production of the primary flash light by the strobo as well as causes the ready signal generator to generate a multi-level wave signal which drives light emitting diode 114 for one sec. at a frequency of eight Hz. The flickering of light emitting diode 114 at this time indicates that a proper exposure has been obtained by the flash photography.

It is to be noted that a substantially proper exposure may be obtained with little exposure error of practical significance even in the case where the strobo produces the primary flash light to full extent, i.e., in the case where the electricity stored in main capacitor 46 of the strobo is entirely released for the primary flash. In order for the above indication by the flickering of light emitting diode 114 to be effected in this case, too, a reference voltage which is to be compared with the voltage level of capacitor 129 is changed to a lower level after the completion of the primary flash of the strobo. Thus, a high voltage signal is generated at terminal 24 so that the ready signal generator 163 generates the above multi-level wave signal for the indication, so long as capacitor 129 has been charged up to the lowered reference voltage level after the completion of the primary flash of the strobo to the full extent.

In the case where a continuous photographing mode using a motorized automatic film winder is selected, i.e., pictures are taken on several film frames within one sec., the indication by the flickering of light emitting diode 114 is stopped each time a succeeding photographic operation starts.

Now, detailed explanation is given of the circuits shown in FIGS. 4 and 5 in which the same reference members are used for members corresponding to those in FIGS. 1 to 3.

Referring to FIG. 3, a light measuring circuit 101 includes operational amplifiers 5 and 8 shown in FIG. 1 while a diaphragm control circuit 102 includes operational amplifiers 27, 37, 41 and switching circuit 31 shown in FIG. 1. A circuit including transistors 104, 105 and resistors 106 to 110 serves to give an exposure time, which is capable of synchronizing with a primary flash of the strobo, in response to the ready signal. The voltage component of 1.5 V, which is included in the ready signal applied to terminal 103, is used as a normal bias signal for transistors 104 and 105. When switch 15 is closed in conjunction with initiation of an exposure, transistor 104 turns on such that a capacitor 16 is charged by a current flowing through resistor 106 and transistor 104 as well as by a current flowing through switch 15 and transistor 13. Due to the charge of capacitor 16 by the both currents, the voltage across capacitor 16 reaches a threshold level of a switching circuit 17' within a period of time being sufficiently shorter than 1/60 sec. Thus, unless operation of transistor 105 is taken into account, switching circuit 17' generates a high voltage signal immediately after the closing of switch 15 such that electromagnet 19 is de-energized by the high voltage signal. In fact, however, electromagnet 19 continues to be energized so long as transistor 105 remains at an ON state.

When the supply of the ready signal to the camera is stopped upon a primary flash of the strobo as hereinafter described, transistor 105 turns off and electromagnet 19 is de-energized, thereby causing the shutter to start closing.

A circuit including comparator 111, a reference voltage source 112, a resistor and, a light emitting diode 114 receives the ready signal from terminal 103 and indicates that the strobo is ready for flash photography. The reference voltage generated by voltage source 112 is set or adjusted to a voltage level such as 1.7 V which is slightly higher than 1.5 V. In response to the ready signal which oscillates between 1.5 V and 2.5 V, comparator 111 generates a high voltage signal and a low voltage signal in an alternative fashion, thereby causing light emitting diode 114 to flicker at the same frequency as the ready signal.

A one-shot circuit 116 generates a single pulse having a relative short width of time, for example one msec., in response to the closing of switch 21. At the same time, one-shot circuit 22 generates a single pulse having a relatively long width of time, for example forty-five msec. The pulse from one-shot circuit 116 renders transistor 117 conductive such that the voltage at terminal 103 is compelled to drop down to a low level. This low voltage signal is used as a preliminary flash command signal. The pulse from one-shot circuit 22 is fed to a NOR gate 120, through an AND gate 119, causing the output of NOR gate 120 to become a low level so that an NPN transistor 121 turns on. As a result, the voltage at terminal 24, which is connected to the collector of transistor 121, rises up to a high level.

The strobo generates the ready signal as well as applies a given voltage signal of, for example one volt to terminal 24, as hereinafter described in detail with reference to FIG. 5. A comparator 122, a reference voltage source 123, a NOR gate 202 and an inverter 208 together constitute a detecting circuit which detects whether or not the strobo in use is a strobo dedicated or specially designed for the camera having the circuit shown in FIG. 4, i.e., a strobo having the circuit shown in FIG. 5. The reference voltage generated by voltage source 123 is set or adjusted to 0.8 V. When a strobo having the circuit shown in FIG. 5 is used with the camera, comparator 122 generates a high voltage signal which is fed to a NOR gate 202 as well as to AND gate 119, When a mode selection switch 200 is closed to select an automatic flash photography mode, a high voltage signal appears at a junction 209. Until diaphragm 4 is stopped-down to a specific aperture for flash photography, diaphragm control circuit 102 generates a low voltage signal and inverter 201 generates a high voltage signal. Therefore, AND gate 119 generates a high voltage signal if one-shot circuit 22 generates a high voltage signal. The high voltage signal from AND gate 119 causes the output of NOR gate 120 to become a low level and thereby renders transistor 121 conductive so that a high voltage signal appears at the collector of transistor 121 which is connected to terminal 24. This high voltage signal is used as a preliminary flash control signal which, in the second embodiment, controls only termination of a preliminary flash of the strobo. When the diaphragm is stopped down to a specific aperture for a flash photography, the output voltage of diaphragm control circuit 102 is inverted from a low level to a high level. Thus AND gate 119 is enabled to generate a low voltage signal, and the preliminary flash control signal disappears so that the strobo stops producing the preliminary flash light.

An electromagnet 33' is of the type having a permanent magnet at its core (not shown) and its armature (not shown) interlocked with a diaphragm arresting member (not shown) is reset by a proper preparatory operation for a succeeding photographing such as a film winding and shutter charge operation so as to be held on the core by the electromagnetic attractive force of the permanent magnet. In this condition, the arresting member allows stop-down operation of the diaphragm. However, when the output voltage of diaphragm control circuit 102 is inverted from a low level to a high level as described above, AND gate 203 generates a high voltage signal, which in turn renders transistors 204 and 205 conductive so that capacitor 206, which has been charged through resistor 207, is discharged through the winding of electromagnet 33'. Thus, electromagnet 33' is energized, cancelling the electromagnetic attractive force of the permanent magnet and thereby allowing the diaphragm arresting member to arrest the diaphragm which is in the course of the stop-down operation. Hence, the diaphragm aperture is determined to the specific aperture for flash photography. It is to be noted that the diaphragm can be stopped-down to a preset aperture when mode selection switch 200 is opened.

In contrast, assume that a strobo which is not dedicated or specially designed for camera having the circuit shown in FIG. 4 and which has no function of producing a preliminary flash light prior to production of a primary flash light is used with the camera. Such a strobo may be constructed so that it can generate a ready signal having the same feature as the above described ready signal but cannot generate any voltage signal which is higher than the reference voltage generated by voltage source 123. In this case, comparator 122 generates a low voltage signal and AND gate 119 remains disabled so that no preliminary flash control signal will be generated. Additionally, since the supply of the ready signal to terminal 103 causes the output of inverter 208 to become a low level, OR gate 202 generates a low voltage signal. Thus, even if diaphragm control circuit 102 generates a high voltage signal, AND gate 203 remains disabled and electromagnet 33' is not energized so that diaphragm 4 is allowed to be stopped-down to a preset aperture.

In the circuit shown in FIG. 4, a primary flash stop signal is generated by a monitor circuit whereas it is generated by an exposure time control circuit including logarithmic expansion transistor 13 in the first embodiment. The monitor circuit includes a flash light amount integrating means having a transistor 128, a capacitor 129 and switches 130 and 131, a reference voltage generator having constant current sources 132 and 133 and a resistor 134, a comparator 135, and a switching circuit having a delay circuit 136 and a transistor 137. Switches 130 and 131 are closed and opened respectively, in response to initiation of an exposure. It is to be noted that switch 15 may be commonly used as switch 130. Delay circuit 136 generates a low voltage signal after a given period of time from the closing of switch 130, the given period of time being, for example, twenty-five msec. and longer than the period of time from the closing of switch 130 to completion of a primary flash of the strobo to full extent. During production of a primary flash light by the strobo, transistor 137 remains at an ON state and a first reference voltage which depends upon the sum of the currents flowing through constant current sources 132 and 133, is generated across resistor 134. When the voltage across capacitor 129 exceeds the first reference voltage due to the charging of capacitor 129, the output of comparator 135 is inverted from a low level to a high level, in response to which one-shot circuit 20 generates a pulsive high voltage signal. This signal is transmitted to terminal 24 through NOR gate 120 and transistor 121 and used as a primary flash stop signal. When delay circuit 136 turns to generate a low voltage signal after completion of a primary flash of the strobo to the full extent, transistor 137 turns off and a second reference voltage, which depends only upon the current flowing through constant current source 132, is generated across resistor 134. Since the second reference voltage is lower than the first reference voltage, a pulsive high voltage signal is generated from terminal 24 after the delay time given by delay circuit 136 so long as the voltage across capacitor 129 has exceed the second reference voltage, even if it is below the first reference voltage. The second reference voltage corresponds to an under-exposure by 0.5 EV which is of little practical significance while the first reference voltage corresponds to an exactly proper exposure. In other words, a picture may be taken with a substantially proper exposure when the voltage across capacitor 129 is compared with the second reference voltage and with an exactly proper exposure when the voltage across capacitor 129 is compared with the first reference voltage.

Next, detailed explanation is given of the circuit of the strobo.

Referring to FIG. 5, a block 150 represents a circuit including power source 43, D-D converter 45, main capacitor 46, flash tube 47 etc. which are shown at the upper part of FIG. 2. A comparator 151, resistors 152 and 153 and a constant voltage source 154 together constitute a detector which detects whether or not main capacitor 46 has been charged up to a given level. Resistor 152 has an end connected to a positive terminal of main capacitor 46. Comparator 151 generates a high voltage signal which indicates that the voltage across main capacitor 46 is over the given level, when a voltage, which is higher than the voltage generated by constant voltage source 154, appears at a junction 155 between resistors 152 and 153. AND gates 156, 157 a NAND gate 156, inverters 159, 160 and 161 and capacitor 162 together constitute a circuit which issues a single pulse from AND gate 157 as well as inverts the output of inverter 159 from a high level to a low level if the output of comparator 151 is at a high level when a low voltage signal appears at terminal 26' by closing of synchronizing switch 42 inside the camera. The output of inverter 159 is at a high level and the output of AND gate is at a low level when both outputs of terminal 26' and comparator 151 are at a high level. However, when the output of terminal 26' drops down to a low level, inverter 160 immediately turns to generate a high voltage output while inverter 159 turns to generate a low voltage output after a given lapse of time, for example, thirty msec. due to the delay action of capacitor 62. During this delay action, AND gate 157 generates a high level pulse which triggers one-shot circuit 262 connected to junction C and generating a pulse rendering thyrister 62 conductive.

A ready signal generator 163 generates a multi-level wave signal oscillating between 1.5 V and 2.5 V at a given period of, for example, ½ sec. when inverter 159 applies a high voltage signal to an input terminal 164, as well as generates a multi-level wave signal oscillating between 1.5 V and 2.5 V at another given period of, for example, ⅛ sec. when one-shot circuit 185 applies a high voltage signal to another input terminal 165. It is to be noted here that application of a high voltage signal to input terminal 165 is given priority when both of input terminal 164 and 165 receive high voltage signals. An exemplified circuit arrangement of ready signal generator 163 is shown in FIG. 6.

Figure 6:
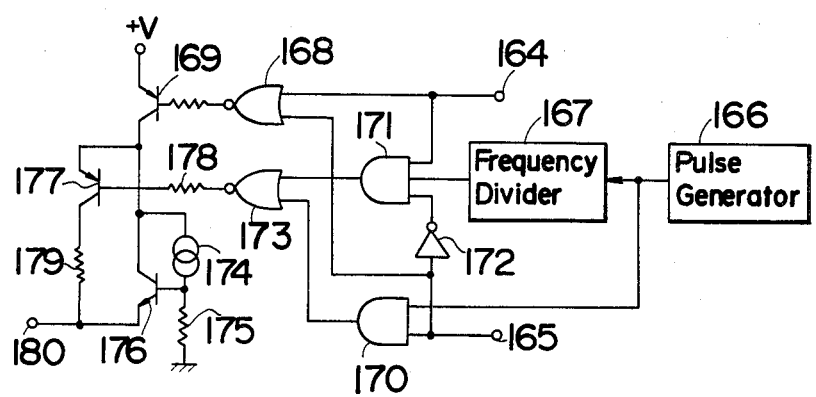
FIG. 6 is an exemplified circuit diagram of a ready signal generator shown in FIG. 5.

With reference to FIG. 6, a pulse generator 166 generates pulses of eight Hz and a frequency divider 167 generates pulses of two Hz. A NOR gate 168 generates a low voltage output to render a transistor 169 conductive when either input terminal 164 or input terminal 165 receives a high voltage signal. An AND gate 170 allows the pulses from pulse generator 166 to pass therethrough when input terminal 165 receives a high voltage signal, while an AND gate 171 allows the pulses from frequency divider 167 to pass therethrough only when input terminals 164 and 165 receive a high voltage signal and a low voltage signal respectively. AND gates 170 and 171 prevent the pulses from pulse generator 166 and frequency divider 167 from passing therethrough respectively when both input terminals 164 and 165 receive low voltage signals. A constant current source 174, a resistor 175 and a transistor 176 together constitute a circuit which issues a constant voltage of 1.5 V from the emitter of transistor 176. A NOR gate 173 alternatively brings transistor 177 into an ON state and an OFF state in accordance with the frequency of the pulses fed from AND gate 170 or fed from AND gate 171. A terminal 180 generates a voltage signal of 1.5 V when transistor 177 is at the OFF state and a voltage signal of 2.5 V substantially equal to the voltage of the battery when transistor 177 is at the ON state.

Referring back to FIG. 5, a transistor 181 and resistors 182, 183 and 184 constitute a command signal detector which detects a preliminary flash command signal. With a ready signal being generated, transistor 181 is rendered conductive so that a low voltage signal appears at its collector. However, when the output appearing at terminal 103' connected to terminal 103 drops down to a low level for one msec. in response to closing of switch 21, transistor 181 turns off so that a high voltage signal appears at its collector. This high voltage signal is applied to a reset terminal 186 of a one-shot circuit 185 as well as to one of input terminals of an AND gate 187.

Thus, if main capacitor 46 has been charged up to the given level and thus inventer 159 is generating a high voltage signal, AND gate 187 generates a high voltage signal, triggering a one-shot circuit 188, which in turn generates a high voltage signal having a width of sixty msec. On the other hand, an AND 190 and an OR gate 192 allow the high voltage signal from AND gate 187 to pass therethrough toward flash tube trigger circuit 48 inside block 150 through junction B.

A voltage regulator or constant voltage source 196 generates a voltage signal of one V when the output of inverter 159 is at a high level. A comparator 197 and a constant voltage source 198 together constitute a circuit which detects a preliminary flash control signal fed from the camera through terminal 24'. Voltage source 198 is adapted to generate a voltage of 1.5 V. Thus, comparator 197 generates a high voltage signal when a preliminary flash control signal whose voltage level is over 1.5 V is generated.

Therefore it is to be understood that an AND gate 189, receiving high voltage signals at its both input terminals, generates a high voltage signal fed to the base of transistor 57 through junction A, when both a preliminary flash command signal and a preliminary flash control signal are applied to the strobo through terminals 103' and 24', respectively, under the existance of the ready signal indicating that the strobo is ready for flash photography. The preliminary flash control signal is restricted to last for at longest forty-five msec. under the control of the output of one-shot circuit 22 inside the camera. Even if the preliminary flash control signal continues to be generated beyond the restricted period of time due to unexpected reasons, the period of time of the preliminary flash of the strobo does not exceeds sixty msec. since a one-shot circuit 188 generates a voltage signal which drops down to a low level after the lapse of sixty msec. from generation of a high voltage signal by AND gate 187, i.e., from the initiation of the prelimiary flash of the strobo.

When synchronizing switch 42 is closed upon a full opening of the shutter, a single pulse and a low voltage signal are generated by AND gate 157 and inverter 159 respectively, as described above. In response to the single pulse, one-shot circuit 262 is triggered to generate a high voltage signal having a width of eight msec. This high voltage signal enables the strobo to produce a primary flash light. Upon the primary flash of the strobo, voltage regulator 196 generates a low voltage signal since it receives a low voltage signal from inverter 159. Thus, comparator 197 also generates a low voltage signal. A photodiode 224 disposed inside the strobo to directly receive the light emitted from flash tube 47 is energized to generate a high voltage signal at a junction 226 between a resistor 225 and the photodiode for the period of time during which flash tube 47 continues to produce light. The high voltage signal generated at junction 226 is applied to one input terminal 193b of an AND gate 193.

In case where a proper exposure is achieved in the course of the primary flash of the strobo, a pulsive high voltage signal is applied from the camera to the strobo, so that comparator 197 turns to generate a similar pulsive high voltage signal. Receiving a high voltage signal from junction 226 at input terminal 193b and a high voltage signal from one-shot circuit 262 at input terminal 193a, AND gate 193 allows the pulsive high voltage signal to pass therethrough toward junction D and this signal passing through AND gate 193 causes the strobo to stop producing the primary flash light. If the pulsive high voltage signal is applied from the camera to the strobo prior to a time being eight msec. after closing of synchronizing switch 42, by which the output of one-shot circuit 262 is inverted from a high level to a low level, AND gate 191 generates a high voltage signal in response to the pulsive high voltage signal. The high voltage signal thus generated causes one-shot circuit 185 to generate a high voltage signal having a width of one sec. so that ready signal generator 163 turns to generate pulses of eight Hz, which are in turn applied to comparator 111 inside the camera through terminals 103 and 103', causing light emitting diode 114 to flicker at eight Hz.

The reason for the provision of light receiving element 224 is to prevent trigger circuit 82 from erroneously triggering discharge tube 64 after termination of the primary flash of the strobo. Such erroneous trigger of discharge tube 64 would occur without light receiving element 224 since, even after termination of the primary flash of the strobo, one-shot circuit 262 applies a high voltage signal to AND gate 193 till eight msec. after initiation of the primary flash of the strobo and the pulsive high voltage signal generated by one-shot circuit 20 may be transmitted to AND gate 193 as described heretobefore.

If film winding-up is initiated by means of an automatic motorized film winder (not shown) during the period of time in which the output of one-shot circuit 185 remains at a high level and if a camera release operation for a succeeding photographing is automatically done in subsequence thereto, a preliminary flash command signal is applied to terminal 103' and transistor 181 turns off so that a high voltage signal appears at its collector. In response to this high voltage signal, one-shot circuit 185 is reset to stop generating a high voltage signal. Therefore, ready signal generator 163 stops generating the pulses of eight Hz, whereby flickering of light emitting diode 114 is also stopped.

It is to be noted that the circuit shown in FIG. 4 can be modified by replacing comparator 135, delay circuit 136, transistor 137 and constant current sources 132 and 133 with a pair of parallelly provided comparators and an OR gate having input terminals connected to respective output terminals of the comparators and an output terminal connected to one-shot circuit 20. With the modification, one of the comparators has a pair of input terminals connected to the collector of transistor 128 and a first reference voltage source respectively while the other of the comparators has a pair of input terminals connected to the collector of transistor 128 and a second reference voltage source respectively, wherein the first reference voltage generated by the first reference voltage source is set to be higher than the second reference voltage generated by the second reference voltage source as described in connection with the circuit shown in FIG. 4.

What is claimed is:

1. An automatic electronic flash device for use with a camera which performs T.T.L light measurement while stopping down a diaphragm and which includes means for arresting said diaphragm when the value of the light measurement represents a given relationship with respect to a reference signal, said flash device comprising:
    a pair of synchronizing contacts receiving a synchronizing signal from corresponding synchronizing contacts on said camera when a camera shutter is fully opened;
    a first signal contact receiving a preliminary flash control signal, which at least controls by its trailing edge the timing of termination of the production of the preliminary flash light, from a corresponding signal contact on said camera before receipt of said synchronizing signal at said synchronizing contacts, said first signal contact also receiving a primary flash stop signal, which terminates the production of the primary flash light, from said corresponding first signal contact on said camera after receipt of said synchronizing signal at said synchronizing contacts;
    a control circuit connected to said synchronizing contacts and said first signal contact for passing said preliminary flash control signal without said synchronizing signal having been received at said synchronizing contacts and for passing said primary flash stop signal with said synchronizing signal having been received at said synchronizing contacts;
    means for producing a primary flash light in response to said synchronizing signal received at said synchronizing contacts;
    means for terminating the production of said primary flash light by said primary flash light producing means in response to said primary flash stop signal having passed through said control circuit; and
    means for producing a preliminary flash light whose intensity is relatively low and substantially constant, said preliminary flash light producing means being responsive to the trailing edge of said preliminary flash control signal having passed through said control circuit for the termination of the production of said preliminary flash light.

2. An automatic electronic flash device as defined in claim 1, wherein said preliminary flash producing means is also responsive to the leading edge of said preliminary flash control signal for initiation of the production of said preliminary flash light.

3. An automatic electronic flash device as defined in claim 2, wherein said primary flash producing means and said preliminary flash producing means commonly includes a flash tube and a trigger circuit which triggers said flash tube for causing the same to produce both said primary and preliminary flash lights, said trigger circuit being responsive to the leading edge of said preliminary flash control signal having passed through said control circuit and said synchronizing signal received at said synchronizing contacts.

4. An automatic electronic flash device as defined in claim 3, wherein said preliminary flash producing means includes a preliminary flash enabling circuit responsive to said preliminary flash control signal having passed through said control circuit for enabling said flash tube to continue producing said preliminary flash light so long as said preliminary flash control signal exists.

5. An automatic electronic flash device as defined in claim 1, further comprising a second signal contact receiving a preliminary flash command signal for initiating the production of the preliminary flash light from a corresponding second signal contact on said camera, and wherein said preliminary flash producing means being responsive to said preliminary flash command signal received at said second signal contact for initiation of the production of the preliminary flash light.

6. An automatic electronic flash device as defined in claim 5, further comprising;
    capacitor means for storing electricity as energy for the production of said primary and preliminary flash lights;
    a ready signal generator for generating a ready signal in the form of a multi-level wave signal at its output terminal connected to said second signal contact; and
    a voltage detector for generating on output which causes said ready signal generator to generate said ready signal when said capacitor means has been charged up to a given voltage level.

7. An automatic electronic flash device as defined in claim 6, further comprising:
a first one-shot circuit generating a pulse signal; and
means responsive to said synchronizing signal received at said synchronizing contacts for causing said voltage detector to stop generating said output as well as causing said one-shot circuit to generate said pulse signal,
and wherein said primary flash producing means being responsive to said pulse signal generated by said first one-shot circuit for initiation of the production of said primary flash light.

8. An automatic electronic flash device as defined in claim 7, further comprising means for generating a signal indicating that said flash device is one dedicated for said camera at its output terminal connected to said first signal contact only while said voltage detector is generating said output.

9. An automatic electronic flash device as defined in claim 7, further comprising a second one-shot circuit for generating a pulse signal in response to said primary flash stop signal, and wherein said ready signal generator being also responsive to said pulse signal from said second one-shot circuit for generating a flash control termination signal in the form of a multi-level wave signal at its output terminal connected to said second signal contact.

10. An automatic electronic flash device as defined in claim 9, wherein the frequencies of said ready signal and said flash control termination signal generated by said ready signal generator are set to be distinguishably different from one another.

11. An automatic electronic flash device as defined in claim 7, wherein said control circuit includes means connected to said voltage detector for passing said preliminary flash control signal only with said output generated by said voltage detector.

12. An automatic electronic flash device as defined in claim 11, wherein said control circuit includes means connected to said voltage detector for causing said preliminary flash light producing means to start producing said preliminary flash light in response to said preliminary flash command signal only with said output generated by said voltage detector.

* * * * *